(12) United States Patent
Miller (10) Patent No.: US 11,914,876 B2
(45) Date of Patent: *Feb. 27, 2024

(54) ASYNCHRONOUS POWER LOSS HANDLING APPROACH FOR A MEMORY SUB-SYSTEM

(71) Applicant: Micron Technology, Inc., Boise, ID (US)

(72) Inventor: Michael G. Miller, Boise, ID (US)

(73) Assignee: Micron Technology, Inc., Boise, ID (US)

(*) Notice: Subject to any disclaimer, the term of this patent is extended or adjusted under 35 U.S.C. 154(b) by 66 days.

This patent is subject to a terminal disclaimer.

(21) Appl. No.: 17/444,416

(22) Filed: Aug. 4, 2021

(65) Prior Publication Data

US 2021/0365184 A1 Nov. 25, 2021

Related U.S. Application Data

(63) Continuation of application No. 15/929,883, filed on May 27, 2020, now Pat. No. 11,106,372.

(60) Provisional application No. 62/954,235, filed on Dec. 27, 2019.

(51) Int. Cl.
G06F 3/06 (2006.01)

(52) U.S. Cl.
CPC ............ *G06F 3/064* (2013.01); *G06F 3/0604* (2013.01); *G06F 3/0625* (2013.01); *G06F 3/0685* (2013.01)

(58) Field of Classification Search
CPC ...... G06F 3/064; G06F 3/0604; G06F 3/0625; G06F 3/0685
See application file for complete search history.

(56) References Cited

U.S. PATENT DOCUMENTS

| 8,819,337 | B1* | 8/2014 | Oshinsky ............ G06F 12/0246 |
| | | | 365/185.11 |
| 9,691,485 | B1 | 6/2017 | Kumar et al. |
| 10,871,924 | B1* | 12/2020 | Lin ...................... G06F 3/0659 |
| 2006/0259718 | A1 | 11/2006 | Paley |
| 2009/0150599 | A1 | 6/2009 | Bennett |
| 2011/0138222 | A1 | 6/2011 | Haines et al. |

(Continued)

FOREIGN PATENT DOCUMENTS

| CN | 108701084 A | 10/2018 |
| CN | 109815160 A | 5/2019 |
| CN | 110459256 A | 11/2019 |

OTHER PUBLICATIONS

Micron, "How Micron SSDs Handle Unexpected Power Loss", 2014, pp. 1-4 (Year: 2014).

*Primary Examiner* — Ryan Bertram
(74) *Attorney, Agent, or Firm* — Lowenstein Sandler LLP (57) ABSTRACT

The occurrence of an asynchronous power loss (APL) event is detected in a memory sub-system. In response, an APL handling operation is performed. The APL handing operation includes identifying a last written page at a first page location in a block of the memory device, wherein the last written page is associated with a memory cell of the memory device, copying data from the last written page and from a related page associated with the memory cell to a temporary storage area in the memory device, copying the data from the temporary storage area to a second page location in the block of the memory device, and providing a notification that the memory device has recovered from the APL event.

20 Claims, 6 Drawing Sheets

(56) References Cited

U.S. PATENT DOCUMENTS

| | | | |
|---|---|---|---|
| 2013/0173848 A1* | 7/2013 | Lassa | G06F 3/065 |
| | | | 711/E12.008 |
| 2014/0269053 A1 | 9/2014 | Chen et al. | |
| 2014/0372710 A1* | 12/2014 | Bisht | G06F 11/1441 |
| | | | 711/143 |
| 2015/0135039 A1* | 5/2015 | Mekhanik | G11C 11/5628 |
| | | | 365/185.02 |
| 2015/0227314 A1 | 8/2015 | Chen et al. | |
| 2018/0157428 A1* | 6/2018 | Li | G06F 11/108 |
| 2019/0056989 A1* | 2/2019 | Srinivasan | G11C 16/28 |
| 2019/0155744 A1 | 5/2019 | Srinivasan et al. | |
| 2019/0196743 A1* | 6/2019 | Hsieh | G06F 12/16 |
| 2019/0310923 A1 | 10/2019 | Jun et al. | |
| 2019/0347015 A1 | 11/2019 | Luo et al. | |
| 2020/0027514 A1 | 1/2020 | Miller et al. | |
| 2020/0409805 A1 | 12/2020 | Kim et al. | |
| 2021/0026738 A1 | 1/2021 | Lin | |

\* cited by examiner

ASYNCHRONOUS POWER LOSS HANDLING APPROACH FOR A MEMORY SUB-SYSTEM

RELATED APPLICATION

This application is a continuation of U.S. patent application Ser. No. 15/929,883 filed May 27, 2020, which claims the benefit of U.S. Provisional Patent Application Ser. No. 62/954,235, filed Dec. 27, 2019, the entire contents of each of which are hereby incorporated by reference herein.

TECHNICAL FIELD

Embodiments of the disclosure relate generally to memory sub-systems, and more specifically, relate to asynchronous power loss (APL) handling approach for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to APL handling logic for a memory sub-system, including no hold-up capacitance type systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device. Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane includes a set of physical blocks. Each block includes a set of pages. Each page includes a set of memory cells ("cells"). A cell is an electronic circuit that stores information. A block hereinafter refers to a unit of the memory device used to store data and can include a group of memory cells, a word line group, a word line, or individual memory cells.

Each of the memory devices can include one or more arrays of memory cells. Depending on the cell type, a cell can store one or more bits of binary information, and has various logic states that correlate to the number of bits being stored. The logic states can be represented by binary values, such as "0" and "1," or combinations of such values. There are various types of cells, such as single level cells (SLCs), multi-level cells (MLCs), triple level cells (TLCs), and quad-level cells (QLCs). For example, a SLC can store one bit of information and has two logic states.

Generally, the conventional memory sub-system can receive a request from a host system to perform a programming operation to store data at the memory device. However, during the operation of the memory device, the memory sub-system can experience loss of power, also referred to herein as asynchronous power loss (APL) or an APL event. APL is a sudden and unexpected power loss that is not preceded by a shutdown notification from the host system. Loss of power can affect one or more pages. That is, subsequent data reads can fail when the data at one or more pages are affected by the loss of power. In contrast, a controlled shutdown is a shutdown of power preceded by a notification from the host system. The memory subsystem completes any unfinished write operations and saves any updated data addressing information. After all data is saved, the memory sub-system sends an acknowledge message to the host system that it is safe to remove power.

A conventional memory sub-system, in response to APL, can search for a last written page (LWP) of blocks of a memory device and perform a margin read operation on the last written page to determine whether the APL caused data loss in the memory device. The LWP of a block can be determined by locating a first erased page (FEP) of the block. The FEP can be the next page that is available to be programmed in a sequence map of pages, the sequence map being managed by a controller of the memory sub-system. The LWP is the page before the FEP in the sequence map. The FEP can be an open page that shares the same word line with other pages that are already programmed. Similarly, an open block is an open block where other pages that are part of the same block have not be programmed. A margin read operation is a set of one or more erased page checks, a set of one or more programmed page checks, or any combination thereof. The margin read operations can be implemented in a read margin type algorithm. The margin read algorithm can include a set of one or more read operation that uses different margin read reference settings to evaluate whether a page is erased or programmed. For example, to determine whether the LWP is programmed, the margin read uses a margin read reference setting that is greater than a default read reference level that is used by a normal read operation to read the page. The read reference level can be moved by offsetting a read voltage level by a certain amount of millivolts. If the margin read is successful, then the LWP is a normally written page (e.g., as a page that is not affected by APL) and all data in the memory device is recovered. If the margin read is not successful, then a determination is made as to whether the read was not successful because of a data retention loss or the APL. To make this determination, additional pages in the block that were written before the LWP can be attempted to be read. Alternatively, other written pages in vicinity to the LWP can be attempted to be read. In some instances, a certain number of blocks are programmed at the same time, so the last written pages of the other blocks that were programmed at the same time as the block are also scanned and checked with margin read operations. To determine whether APL occurred during programming, every block of a superblock can be scanned using the conventional technique, which can incur processing delays to complete. A superblock, also referred to as virtual block, is the logical grouping of all blocks in all LUNs that have the same logical block number. Also, inaccurate determinations of asynchronous power loss can result by performing the margin read operations if the offset is not properly configured, which can have an impact on performance of the memory sub-system by triggering folding. Folding is the internal migration of data from one NAND location to another NAND location independent of any direct host interaction. Folding is performed to pack valid data together (garbage collection), freeing more space for new write operations, for error avoidance, for wear leveling, and to restore Redundant array of independent NAND (RAIN) parity protection in the event of an error.

Storage of data on certain memory devices having different media types relies on precise placement of electric charges into memory cells of the memory devices. The amount of charge placed on a memory cell may be used to represent a value stored by the memory cell. Depending on the amount of the charge placed, passage of electric current through the memory cell may require an application of a value-specific threshold voltage. Readability of the memory cells depends critically on distinctiveness of threshold voltages representing different stored values. Because of inevitable variations in sizes, locations, and environments of various memory cells, even if implemented on the same substrate, the threshold voltages that correspond to a given value for various memory cells are not identical and fall within a distribution of some voltage width. Yet, as long as the distributions corresponding to different values overlap insignificantly, an occasional erroneously stored value may be detected and corrected by an error-correction code. These distributions may become shifted, broadened, or otherwise distorted over time. These distributions can be characterized and corresponding read reference register settings can be stored and modified accordingly to accommodate the characterized distributions and the distortions. Similarly, the read reference levels for margin read operations for both erased page checks and programmed page checks require proper characterizations to determine whether pages are affected by APL using the erased page checks and the programmed page checks. In general, during an erased page check of a margin read algorithm, a default read reference level is set to a margin read setting that is different to determine if the page is erased. The margin read setting is set to be less than the default setting, resulting in the possibility of false results where the page passed the erased page check, but is not actually an erased page. That is, the page is a fake empty page because it is not actually empty, rather includes charge from the programming during a programming pass that was interrupted or from a previous programming pass. In general, during a programmed page check of the margin read algorithm, the default read reference level is set to a margin read setting that is different to determine if the page is programmed. In this case, the margin read setting is set to be more than the default setting, resulting in the possibility of errors caused by late APL, such as during a second programming pass of TLC (e.g., XX1). In this case, most of the distribution of cells for the programmed states are still less than the margin read reference setting, but some could fail as the last distribution could start to pass the margin read reference setting.

As a result, the conventional APL handling approaches can be complex, requiring complexity of firmware implementation of the different margin read operations, proper characterization of the memory device to determine read reference settings for margin read operations for both erased page checks and programmed page checks. The conventional APL handling approaches are subject to cell process and behavior variations of the memory devices. Due to the complexity of the conventional APL handing approaches, time-to-ready (TTR) performance suffers, especially with limited hardware controller capability.

Aspects of the present disclosure address the above and other deficiencies by providing APL handling logic to handle data possibly affected by prior power loss when the prior power loss has been detected to have occurred, while avoiding the numerous scans and margin read operations of the conventional technique. As a result, the speed of getting the memory sub-system to a ready state improves, thereby resulting in a faster boot-up time of the memory sub-system and less resources used. In addition, the process of detecting a prior power loss and selecting to perform the associated handling procedures can be enhanced since it is assumed that all last written pages that are possibly affected by APL, meaning all "readable last written pages" or "recoverable last written pages," are moved into a temporary area of a block and rewritten back as good data, whereas all unrecoverable data is discarded. "Readable pages" are pages that are read without errors. In some cases, the data read from the last written pages have errors, but the data is still recoverable using a read recovery algorithm. These pages are considered "recoverable last written pages." Aspects of the present disclosure eliminate the need for any margin type read operations, such as erased page checks and programmed page checks as described herein. Without any margin read type operations, the resources and time used for these margin read operations are eliminated and the risk of incorrectly detecting a page is reduced considerably. In some implementations, the error mitigation steps that are defined to recover the data from the last written page can be designed with the least cost and energy (i.e., number of steps and latency) to further reduce a time to ready (TTR) metric for certain design requirements.

Advantages of the present disclosure include, but are not limited to, a reduction in the use of margin read operations in determining the state of memory pages in response to an APL event, a reduction in experiments and evaluations of all possible cases to calibrate default settings for margin read operations, a reduction in risk of incorrectly detecting a page, and a reduction in the TTR metric for a memory device(s) to be ready for a subsequent programming operation after the APL event.

Figure 1:
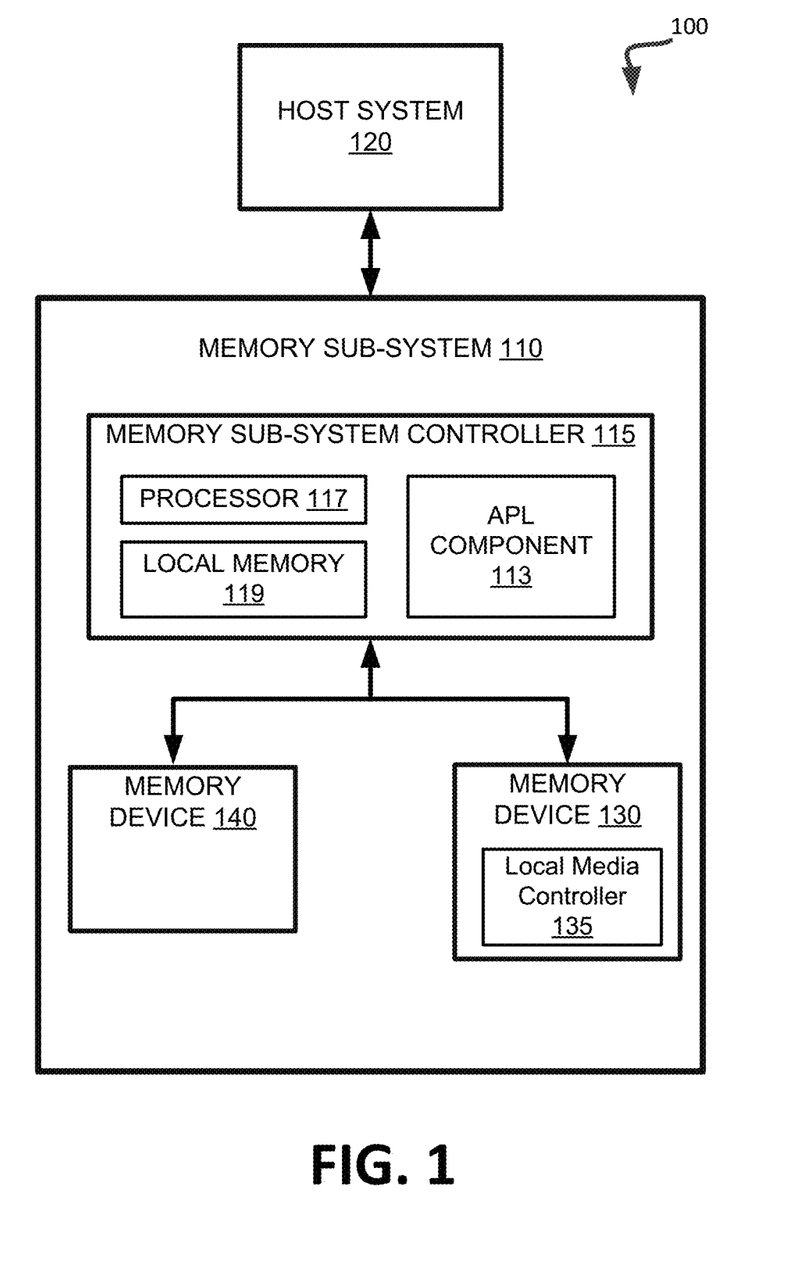
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, universal serial bus (USB) interface, Fibre Channel, Serial Attached Small Computer System Interface (SAS), a double data rate (DDR) memory bus, Small Computer System Interface (SCSI), a dual in-line memory module (DIMM) interface (e.g., DIMM socket interface that supports DDR), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, SLC can store one bit per cell. Other types of memory cells, such as MLCs, TLCs, QLCs, and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115, for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes an APL component 113 capable of detecting an APL event and performing an APL handling process for each of one or more memory devices 130 and/or 140. In some instances, the APL component 113 can determine a first erased page (FEP) in a block of the memory device and determine a last written page (LWP) in the block from the FEP. The FEP can be the next page that is available to be programmed in a sequence map of pages, the sequence map being managed by the controller 115. The FEP can be identified by a write pointer. The LWP is the page before the FEP in the sequence map. The LWP can also be identified by a separate write pointer or derived from the write pointer. The APL component 113 reads the data (or recovers the data) from the LWP and additional data from any peer pages corresponding to the LWP. A peer page is a page that is related to the LWP and is considered part of a same page stack as the LWP. For example, the LWP can be a lower page and the peer page is the upper page of the same memory cell. For another example, the LPW can be an upper page and the peer page is the lower page. Since data is programmed and read from a memory cell on a page-by-page basis, each page associated with the memory cell can be read. For an example, a read operation can read the lower page data from the lower page of a MLC and the upper page data from the upper page of the MLC. The APL component 113 copies the data from the LWP and the additional data from the peer pages to a temporary area in the memory device and increments the write point of the FEP by a specified amount, corresponding to a deterministic number of pages in the block. The deterministic number of pages is set by the memory type. A single-level cell has a deterministic number of page types being equal to one. A multi-level (or two-level) cell has a deterministic number of pages types equal to two. The APL component 113 copies the data and the additional data from the temporary area to a page location in the block, the page location being identified by the write pointer after being incremented. After the data and the additional data from the temporary area is copied to the location, the APL component 113 increments the write pointer by the specified amount (i.e., deterministic number of pages). The APL component 113 can perform these operations for each block of the one or more memory devices 130 and/or 140. The APL component 113 can notify the host system 120 that the memory sub-system 110 is in a ready state (e.g., ready for a subsequent programming operation by the host system 120).

In some embodiments, the data at the LWP or the additional data from the peer page(s) is not readable or recoverable. As described above, "readable pages" are pages that are read without errors and "recoverable pages" are pages that are read with errors, but where the data is recovered. In these cases, all unrecoverable data is discarded. In some embodiments, the APL component 113 can initiate the discarding of this data responsive to receiving one or more indications from the ECC (not shown) of the controller 115 that the ECC has failed to correct errors in the data read from the LWP (and the additional data from any peer pages) of the memory device 130 (or 140 or any other memory device that is not shown). The ECC can be based on Hamming, Reed-Solomon, BCB, low density parity check (LDPC) algorithms, or any other error-correction algorithms.

In some embodiments, the memory sub-system controller 115 includes at least a portion of the APL component 113. For example, the memory sub-system controller 115 can include a processor 117 (processing device) configured to execute instructions stored in local memory 119 for performing the operations described herein. In some embodiments, the APL component 113 is part of the host system 120, an application, or an operating system. In some embodiments, the APL component 113 can have configuration data, libraries, and other information stored in the memory device 130 (and/or the memory device 140).

Further details about the operations of the APL component 113 are described below with respect to FIGS. 2-5.

Figure 2:
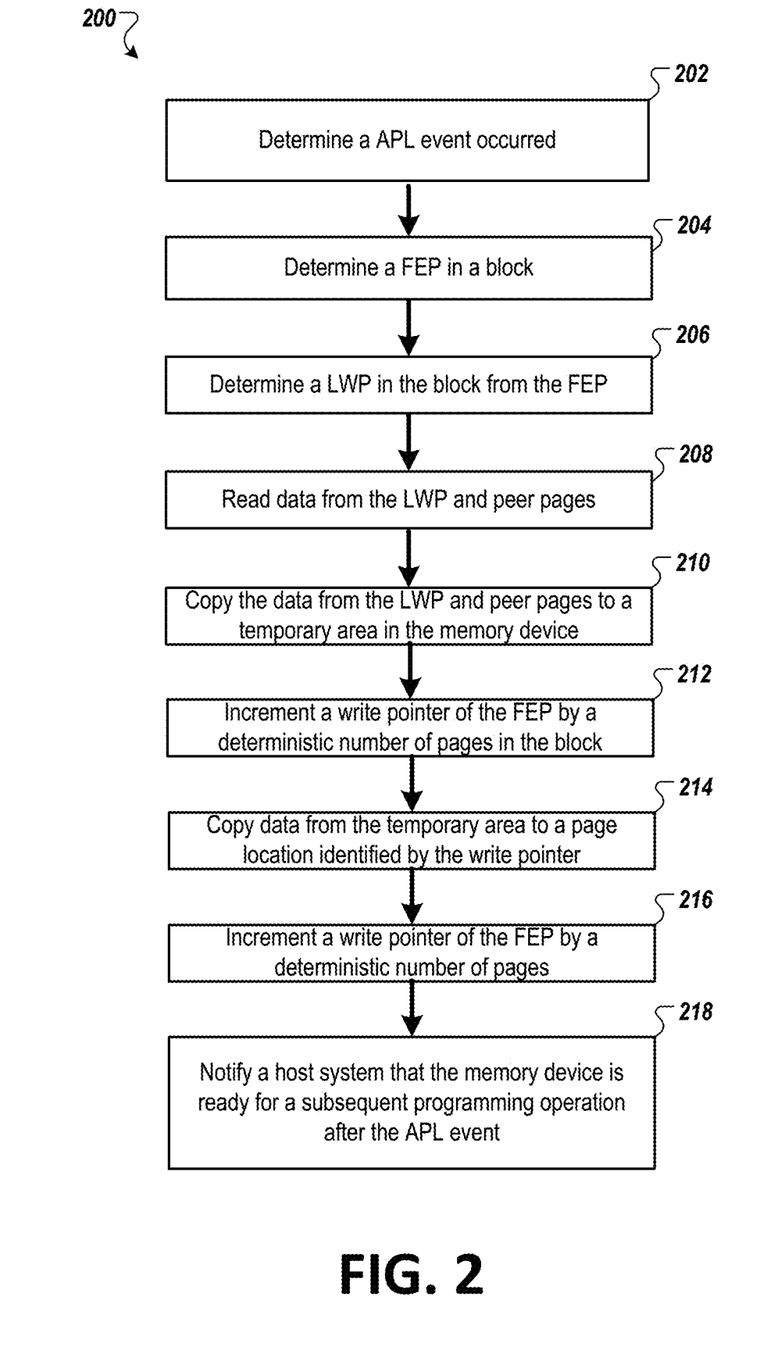
FIG. 2 illustrates a flow diagram of an example method to detect an APL event and handle pages potentially affected by the APL event without margin read operations, in accordance with some embodiments of the present disclosure.

FIG. 2 is a flow diagram of an example method 200 to detect an APL event and handle pages potentially affected by the APL event without margin read operations, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the APL component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, the processing logic determines an asynchronous power loss (APL) event occurred in a system including the processing device and a memory device. APL is a sudden and unexpected power loss that is not preceded by a shutdown notification form the host system. So, when power is restored after the power loss event and there has been no shutdown notification, the processing logic can determine that the APL event occurred. At operation 204, the processing logic determines a first erased page (FEP) in a block of the memory device. The FEP can be determined from a write pointer that stores an indication of the FEP. In another embodiment, the FEP can be determined by the processing logic logically searching for the FEP in the block. The write point can correspond to a logical address of the FEP before being incremented by the deterministic number of pages. In another embodiment, the processing logic determines the FEP by subtracting the deterministic number of pages from a logical address of the FEP to obtain a logical address of the LWP. At operation 206, the processing logic determines, from the FEP, a last written page (LWP) in the block. As described herein, the LWP can be the page before the FEP in a sequence map of the block. In some cases, the pages are indexed with a sequence number, so the FEP can be the sequence number and the LWP is the sequence number of the FEP less one (e.g., FEP-1). At operation 208, the processing logic reads data from the LWP and any peer pages corresponding to the LWP. Since data is programmed and read from a memory cell on a page-by-page basis, each page associated with the memory cell is read. For an example, a read operation can read the lower page data from the lower page of a MLC and the upper page data from the upper page of the MLC. In one case, the LWP can be the lower page and the peer page is the upper page. In another case, the LWP is the upper page and the peer page is the lower page. At operation 210, the processing logic copies the data read from the LWP and any additional data read from the peer pages to a temporary area in the memory device. For example, if the LWP is an extra page (XP), indexed as page 30, the processing logic copies the data stored in the XP, as well as the data stored in the peer pages (e.g., lower page (LP) and upper page (UP)), indexed as pages 28 and 29, respectively. [At operation 212, the processing logic increments a write pointer of the FEP by a deterministic number of pages in the block. Operation 212 can be performed after the data from the LWP and the additional data from the peer pages are copied to the temporary area. At operation 214, the processing logic copies the data and the additional data from the temporary area to a page location in the block identified by the write pointer. The operation 214 can be performed after the write pointer is incremented at operation 212. At operation 216, the processing logic increments the write pointer by the deterministic number of pages. Operation 216 can be performed after the data and the additional data from the temporary area is copied to the page location. At operation 218, the processing logic notifies a host system that the memory device is ready for a subsequent programming operation after the APL event. In some embodiments, a ready signal is sent to a host system. In other embodiments, a ready status is set and can be read by the host system. In some cases, the processing logic releases the memory sub-system to the host system, such as by sending a ready signal to the host system to indicate that the memory sub-system is read for a subsequent programming operation.

In one embodiment, before releasing the memory sub-system at operation 218, the processing logic discards the original data from the LWP and the peer pages corresponding to the LWP. This can be done by writing dummy data in the LWP and peer pages and/or marking the LWP and the peer pages as being invalid. Similarly, before releasing the memory sub-system at operation 218, the processing logic can discard the original data from the FEP and corresponding peer pages.

In one embodiment, the method 200 is performed on a single-level cell and the deterministic number of page types is one. In another embodiment, the method 200 is performed on a two-level cell (also referred to as a multi-level cell) and the deterministic number of page types is two. In another embodiment, the method 200 is performed on a three-level cell and the deterministic number of page types is three. In another embodiment, the method 200 is performed on a four-level cell (also referred to as QLC) and the deterministic number of page types is four. Alternatively, the method 200 is performed on a cell with N levels and the deterministic number of pages is N, where N is a positive integer.

Figure 3:
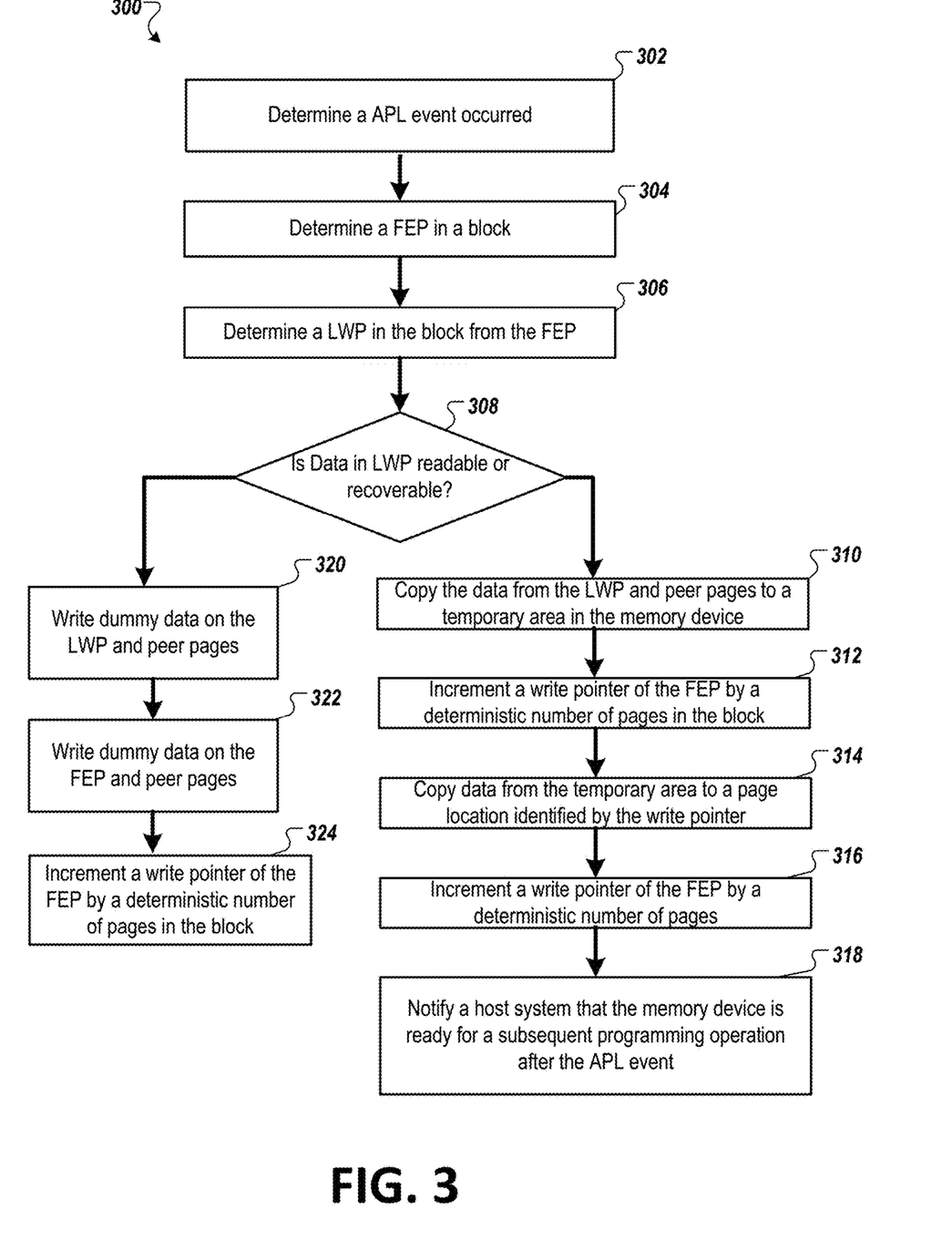
FIG. 3 is a flow diagram of another example method to detect an APL event and handle pages potentially affected by the APL event without margin read operations, in accordance with some embodiments of the present disclosure.

FIG. 3 is a flow diagram of an example method 300 to detect an APL event and handle pages potentially affected by the APL event without margin read operations, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the APL component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, the processing logic determines an APL event occurred in a system including the processing device and a memory device. At operation 304, the processing logic determines a FEP in a block of the memory device. The FEP can be determined from a write pointer that stores an indication of the FEP. At operation 306, the processing logic determines a LWP using the FEP. At operation 308, the processing logic determines whether the data from the LWP and the additional data from the peer pages are readable or recoverable. The pages are readable when the data can be read without error. The pages are recoverable when the read data has errors, but the data is recovered. If the pages are not readable or recoverable at operation 308, the pages are determined to be unrecoverable. The processing logic, responsive to a determination that the data from the LWP and the additional data from the peer pages are readable or recoverable at operation 308, copies the read or recovered data and the additional data to the temporary area at operation 310, and the incrementing the write pointer at operation 312. Operation 312 can be performed after the data from the LWP and the additional data from the peer pages are copied to the temporary area. At operation 3214, the processing logic copies the data and the additional data from the temporary area to a page location in the block identified by the write pointer. The operation 314 can be performed after the write pointer is incremented at operation 312. At operation 316, the processing logic increments the write pointer by the deterministic number of pages. Operation 316 can be performed after the data and the additional data from the temporary area is copied to the page location. At operation 318, the processing logic notifies a host system that the memory device is ready for a subsequent programming operation after the APL event. In some embodiments, a ready signal is sent to a host system. In other embodiments, a ready status is set and can be read by the host system. In some cases, the processing logic releases the memory sub-system to the host system, such as by sending a ready signal to the host system to indicate that the memory sub-system is read for a subsequent programming operation.

Responsive to a determination that the data from the LWP or the additional data from the peer pages is unrecoverable at operation 308, the processing logic writes dummy data on the LWP and the peer pages at operation 320 and writes dummy data on the FEP and peer pages corresponding to the FEP at operation 322. At operation 324, the processing logic increments the write pointer by the deterministic number of pages, such as after the first dummy data and the second dummy data is written. At operation 326, the processing logic notifies a host system that the memory device is ready for a subsequent programming operation after the APL event.

Figure 4:
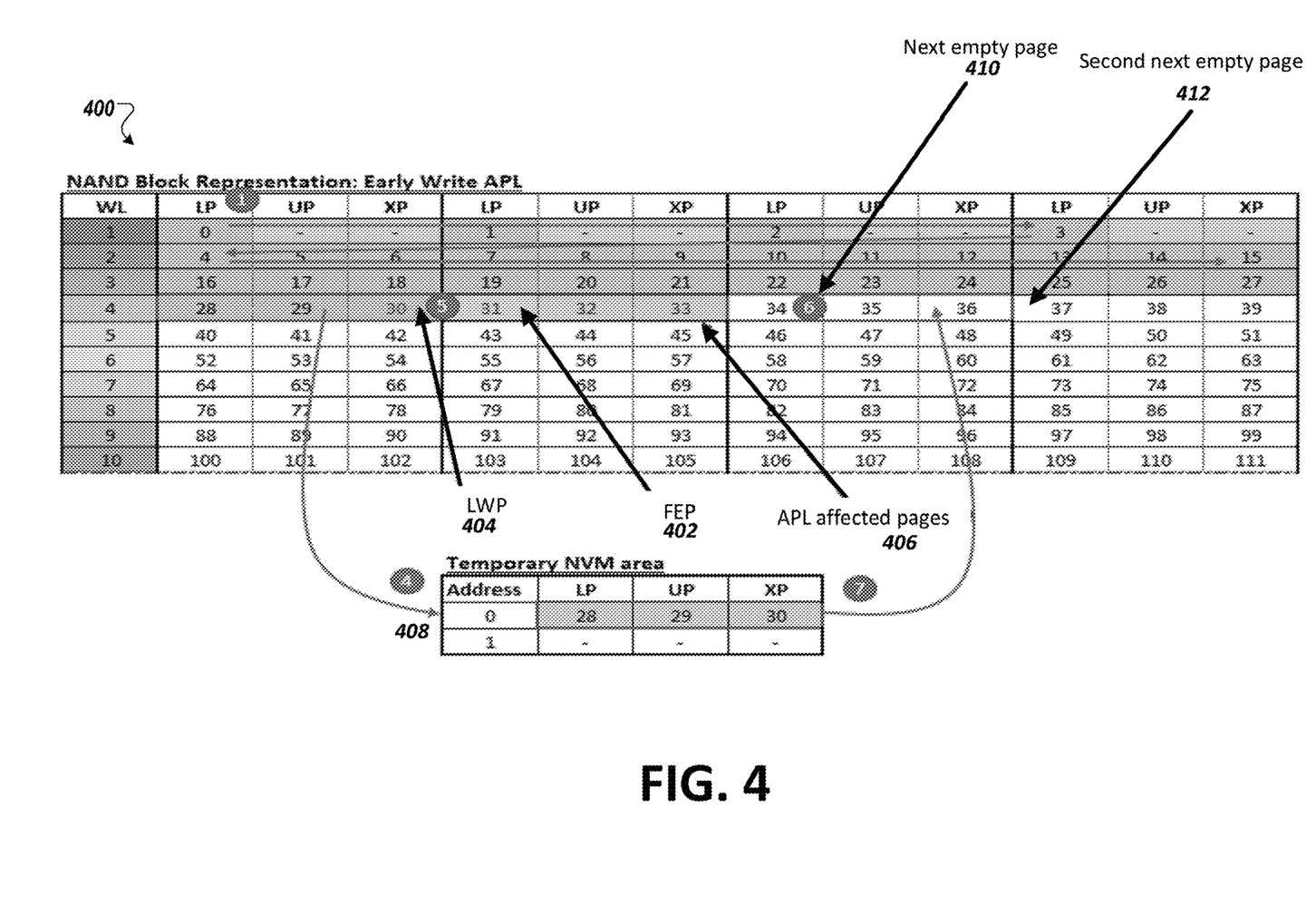
FIG. 4 illustrates an example block map used by APL handling logic without margin read operations, in accordance with some embodiments of the present disclosure.

FIG. 4 illustrates an example block map 400 used by APL handling logic without margin read operations, in accordance with some embodiments of the present disclosure. The APL handling logic can implement one or more operations to detect an APL event and handle pages potentially affected by the APL event without margin read operations. Additional details of the APL handling logic are described herein with respect to the method 200 of FIG. 2, the method 300 of FIG. 3, or other combination of operations. The APL handling logic searches for a first erased page 402 (FEP) in a block, corresponding to the block map 400. The APL handling logic determines a last written page (LWP) 404 from the FEP 402, such as by subtracting a deterministic number from a logical address of the FEP. For example, the logical address of the FEP 402 is 31, which is a LP, so the LWP has a logical address of 30. However, if the FEP were the UP at logical address 32, the LWP could be UP page at logical address 29. Instead of performing erased page checks on the FEP 402 and programmed page checks on the LWP 404 for margin read operations, the APL handling logic issues a read operation to read the LWP 404 and corresponding peer pages as the APL affected pages 406. Since LWP 404 is the XP page at logical address 30, the peer pages are LP page at logical address 28, and UP at logical address 29. If the read operation is successful and the data (and additional data) is read from the LWP 404 and the peer pages, or if the data (and the additional data) is recovered by an error handling process, the APL handling logic copies the data of LWP 404 and the additional data from the corresponding peer pages to a temporary area 408 in the memory device. After, the APL handling logic can write dummy data on the LWP 404 and corresponding peer pages and on the FEP 402 and corresponding peer pages and increments the write pointer to a next empty page 410. The next empty page 410 is a page that is empty and indexed as the next empty page after the FEP 406, which is identified by the write pointer. That is, the write pointer can initially point to an address of the FEP 402 and can be incremented by the deterministic number of pages to update the write pointer to the next empty page 410. The deterministic number of pages in this example is three (e.g., FEP+3) to the next empty page 410. The three can refer to a unit of a numbering sequence used for the block map 400. In other embodiments, the logical addresses can be incremented in other sequences. After incrementing the write pointer to the next empty page 410, the APL handling logic copies the data and the additional data from the temporary area 408 to the next empty page 410, identified by the incremented write pointer. The APL handling logic updates the write pointer again to an address of a second next empty page 412. That is, the write pointer of the next empty page 410 can be incremented by another 3 (e.g., FEP+6) to update the write pointer to a second next empty page 412. The APL handling logic can discard original data from the LWP 404 and corresponding peer pages and the FEP 402 and corresponding peer pages. The APL handling logic avoids the numerous scans and margin read operations that conventional techniques use to handle APL events. As a result, the speed of getting the memory sub-system to a ready state improves, thereby resulting in a faster boot-up time of the memory sub-system and less resources used. In addition, the APL handling logic for detecting a prior power loss and performing the APL handling process as described above can be enhanced since it is assumed that all last written pages are possibly affected by APL, all readable or recoverable last written pages are moved into a temporary area of a block and rewritten back as good data, whereas all unrecoverable data is discarded. The APL handling logic eliminates the need for any margin type read, such as erased page checks and programmed page checks as described herein. Without any margin read type operations, the resources and time used for these margin read operations are eliminated and the risk of incorrectly detecting a page is reduced considerably. In addition, error mitigation steps, which are defined to recover the data from the last written page (and/or the additional data from the peer page(s)), can be designed with the least cost and energy (i.e., number of steps and latency) to further reduce a TTR metric for certain design requirements.

In another embodiment, a system includes a memory device and a processing device, operatively coupled to the memory device. The processing device can include the APL handling logic to: determine that an APL event occurred; determine a FEP in a block of the memory device and determine a LWP in the block from the FEP; read data from the LWP and peer pages corresponding to the LWP; copy the data from the LWP and additional data from the peer pages to a temporary area in the memory device; increment a write pointer of the FEP by a deterministic number of pages in the block; copy the date from the temporary area to a page location in the block, the page location being identified by the write pointer; increment the write pointer again by the deterministic number of pages; and notify a host system that the memory device is ready for a subsequent programming operation after the APL event. In other embodiments, the system can include multiple memory devices and the APL handling logic can handle APL affected pages where the last written pages are identified in each of the multiple devices.

In a further embodiment, the APL handling logic is further to determine whether the data from the LWP and the additional data from the peer pages are readable, recoverable, or unrecoverable. Responsive to a determination that the data from the LWP and the additional data from the peer pages are readable and recoverable, the APL handling logic reads the data and the additional data, copies the data and the additional data to the temporary area, and increments the write pointer, as described above. However, responsive to a determination that the data from the LWP or the additional data from the peer pages is unrecoverable, the APL handling logic writes first dummy data on the LWP and the peer pages and second dummy data on the FEP and peer pages corresponding to the FEP. The APL handling logic increments the write pointer by the deterministic number of pages after the first dummy data and the second dummy data is written.

In another embodiment, the APL handling logic, to determine the FEP, logically searches for the FEP in the block. The write pointer corresponds to a logical address of the FEP before being incremented by the deterministic number of pages. In another embodiment, the APL handling logic, to determine the LWP, subtracts the deterministic number of pages from a logical address of the FEP to obtain a logical address of the LWP.

In a further embodiment, before the APL handling logic releases the memory device to the host system, the processing logic can discard original data from the LWP and the peer pages corresponding to the LWP before notifying the host system that the memory device is ready for a subsequent programming operation after the APL event (e.g., releasing the memory device to the host system). The APL handling logic can also discard original data from the FEP and the peer pages corresponding to the FEP before notifying the host system that the memory device is ready for a subsequent programming operation after the APL event.

In one embodiment, the memory device includes one or more single-level cells and the deterministic number of pages in the block is one. In another embodiment, the memory device includes one or more multi-level cells and the deterministic number of pages in the block is two. In another embodiment, the memory device includes one or more triple-level cells and the deterministic number of pages in the block is three. In another embodiment, the memory device includes one or more quad-level cells and the deterministic number of pages in the block is four. Alternatively, the memory device can include memory cells with N levels and the deterministic number of pages is equal to N.

Figure 5:
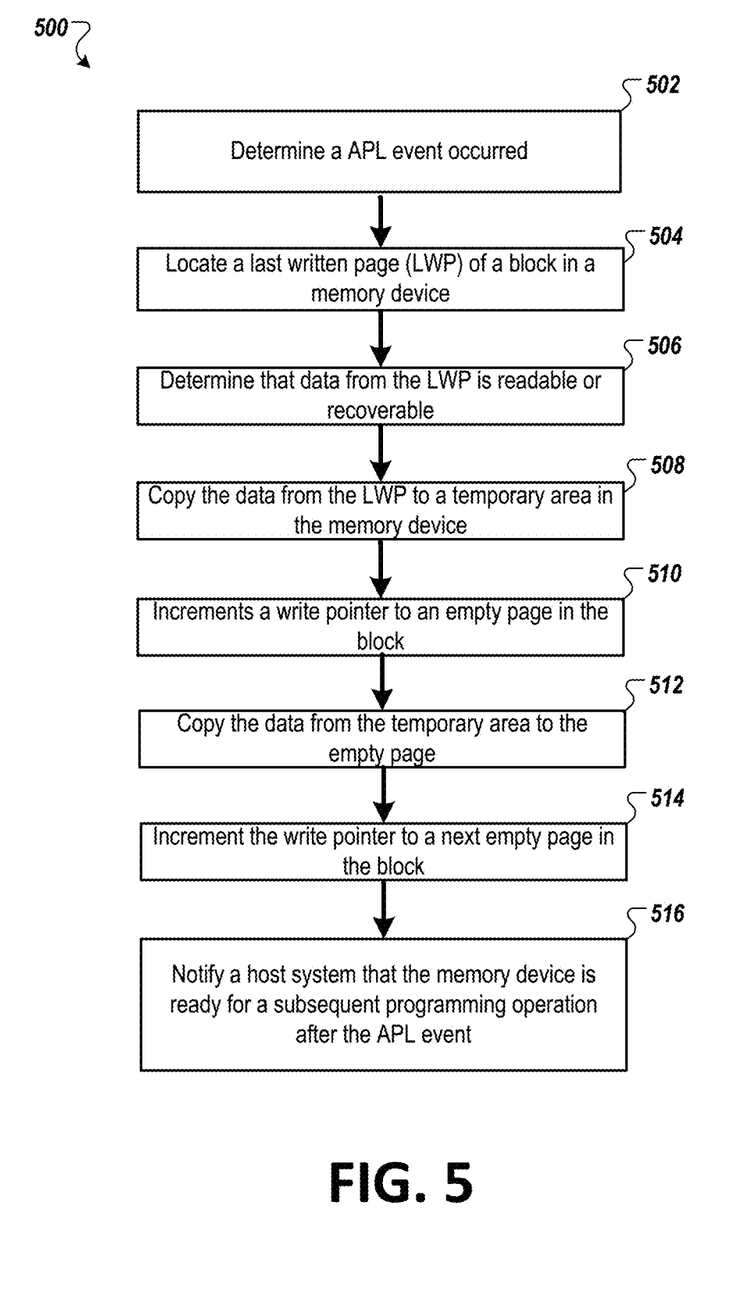
FIG. 5 illustrates a flow diagram of an example method of APL handling without margin read operations, in accordance with some embodiments of the present disclosure.

FIG. 5 illustrates a flow diagram of an example method of APL handling without margin read operations, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the APL component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic determines that an APL event occurred. At operation 504, the processing logic locates a last written page of a block in a memory device. In a further embodiment, the processing logic can locate a last written page of other blocks in other memory devices. For example, the processing logic locates a last written page of a second block in a second memory device. At operation 506, the processing logic determines that data from the last written page is readable or recoverable. Similarly, the processing logic can determine that second data from the last written page of the second block is readable or recoverable. At operation 508, the processing logic copies the data from the last written page to a temporary area in the memory device. In the case of multiple blocks having last written pages, the processing logic also copies the second data from the last written page of the second block to a second temporary area in the memory device. At operation 510, the processing logic increments a write pointer to an empty page in the block. When involving multiple blocks, the processing logic increments the write pointer to an empty page in each of the blocks. At operation 512, the processing logic copies the data from the temporary area to the empty page. Similarly, the processing logic can copy the data from the second temporary area to the respective empty page in the second block. At operation 514, the processing logic increments the write pointer to a next empty page in the block. The processing logic can similar increment the respective write pointers of the other blocks as well. For example, the processing logic increments the second write pointer to a third empty page in the second block. At operation 516, the processing logic notifies a host system that the memory device is ready for a programming operation. When involving multiple blocks, the processing logic can notify the host system after all blocks have been updated accordingly.

In a further embodiment at operation 504, the processing logic locates the last written page by locating a first empty page. The processing logic determines an address of a first empty page of the block and subtracts a number, corresponding to a deterministic number of pages of the memory device, from the address of the first empty page to obtain a logical address of the LWP.

In a further embodiment, the processing logic reads the data from the last written page and reads additional data from a peer page associated with the last written page. As described herein, the peer pages are the pages that correspond to the same memory cell as the last written page. In this embodiment, the processing logic copies the additional data from the peer page to the temporary area. Also, the processing logic writes dummy data on the last written page and the peer page. The processing logic can copy the additional data from the temporary area to an empty peer page associated with the empty page before incrementing the write pointer to the next empty page in the block. The processing logic can discard original data from the last written page and the peer page before notifying the host system.

Figure 6:
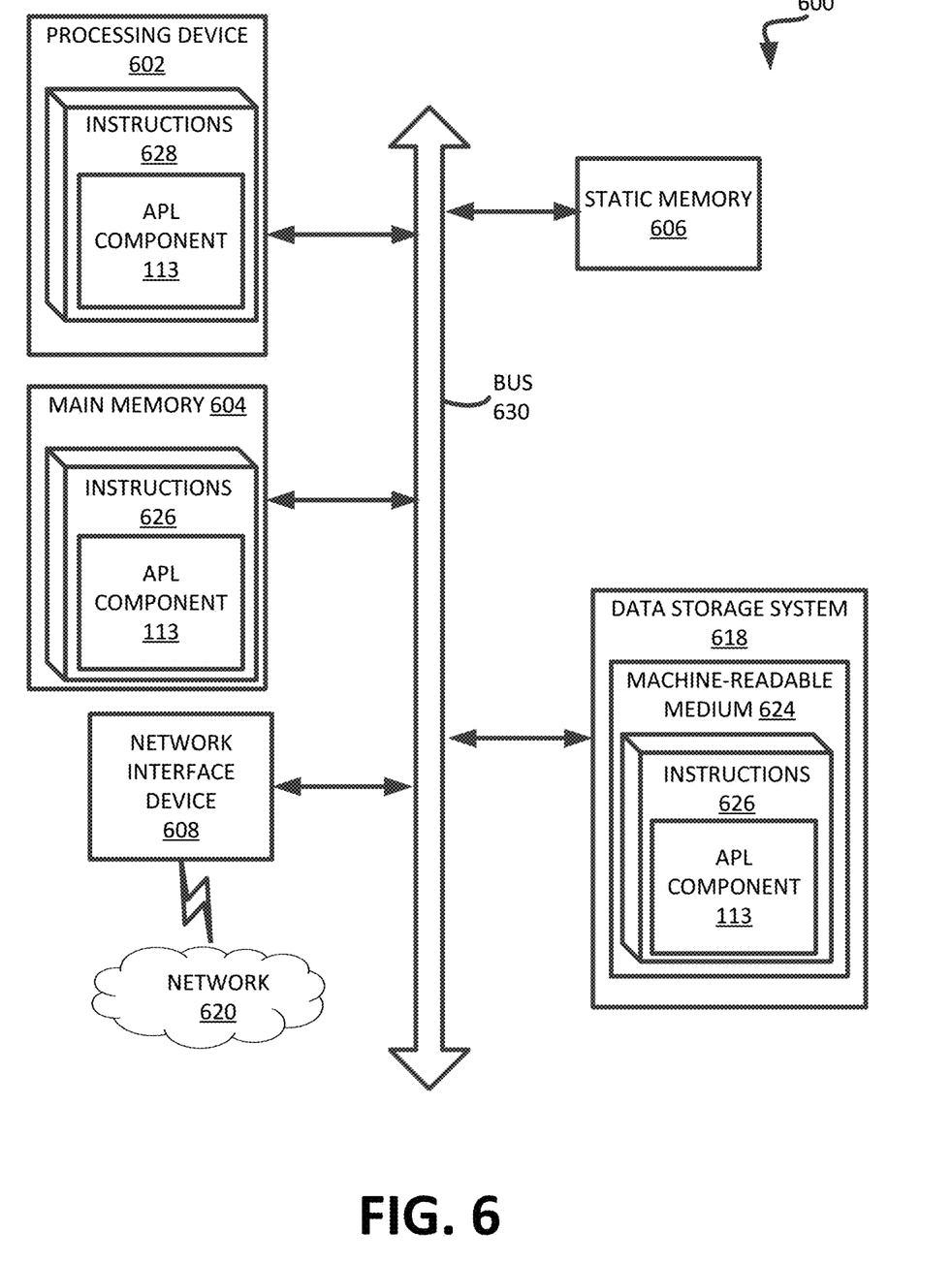
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the APL component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium or a non-transitory computer-readable storage medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an APL component that detects APL events and handles last written pages that can be affected by the APL events (e.g., the APL component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of operations and symbolic representations of operations on data bits within a computer memory. These algorithmic descriptions and representations are the ways used by those skilled in the data processing arts to most effectively convey the substance of their work to others skilled in the art. An algorithm or operation is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms, operations, and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an embodiment" or "one embodiment" or the like throughout is not intended to mean the same embodiment or embodiment unless described as such. One or more embodiments or embodiments described herein may be combined in a particular embodiment or embodiment. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled with the memory device, to perform operations comprising:
      detecting an occurrence of an asynchronous power loss (APL) event in the system;
      responsive to detecting the occurrence of the APL event, performing an APL handling operation comprising:
         identifying a last written page at a first page location in a block of the memory device, wherein the last written page is associated with a memory cell of the memory device;
         copying data from the last written page and from a related page associated with the memory cell to a temporary storage area in the memory device, wherein the related page is part of a same page stack associated with a same wordline of the memory device as the last written page;
         incrementing a write-pointer associated with the last written page by a deterministic number of pages;
         copying the data from the temporary storage area to a second page location in the block of the memory device, wherein the second page location is identified by the write-pointer; and
         providing a notification that the memory device has recovered from the APL event.

2. The system of claim 1, wherein the processing device is to perform further operations comprising:
   determining whether the data from the last written page and additional data from the related page are readable, recoverable, or unrecoverable; and at least one of:
      responsive to a determination that the data from the last written page and the additional data from the related page are readable and recoverable, reading the data, copying the data to the temporary storage area, and incrementing the write pointer; or
      responsive to a determination that the data from the last written page or the additional data from the related page is unrecoverable:
         writing first dummy data on the last written page and the related page and second dummy data on a first erased page in the block; and
         incrementing the write pointer by the deterministic number of pages.

3. The system of claim 2, wherein the processing device is to perform further operations comprising:
   searching for the first erased page in the block, wherein the write pointer corresponds to a logical address of the first erased page before being incremented by the deterministic number of pages.

4. The system of claim 2, wherein identifying the last written page comprises subtracting the deterministic number of pages from a logical address of the first erased page to obtain a logical address of the last written page.

5. The system of claim 2, wherein the processing device is to perform further operations comprising:
   discarding original data from the last written page and the related page associated with the memory cell notifying a host system that the memory device is ready for the subsequent programming operation after the APL event; and
   discarding original data from the first erase page before notifying the host system that the memory device is ready for the subsequent programming operation after the APL event.

6. The system of claim 2, wherein the memory device comprises single-level cell (SLC) memory, and wherein the deterministic number of pages in the block is one.

7. The system of claim 2, wherein the memory device comprises a multi-level cell (MLC) memory, and wherein the deterministic number of pages in the block is two.

8. The system of claim 2, wherein the memory device comprises triple-level cell (TLC) memory, and wherein the deterministic number of pages in the block is three.

9. The system of claim 2, wherein the memory device comprises quad-level cell (QLC) memory, and wherein the deterministic number of pages in the block is four.

10. A method comprising:
    detecting an occurrence of an asynchronous power loss (APL) event in a memory sub-system;
    responsive to detecting the occurrence of the APL event, performing an APL handling operation comprising:
       identifying a last written page at a first page location in a block of a memory device of the memory sub-system, wherein the last written page is associated with a memory cell of the memory device;
       copying data from the last written page and from a related page associated with the memory cell to a temporary storage area in the memory device, wherein the related page is part of a same page stack associated with a same wordline of the memory device as the last written page;

incrementing a write-pointer associated with the last written page by a deterministic number of pages;

copying the data from the temporary storage area to a second page location in the block of the memory device, wherein the second page location is identified by the write-pointer; and providing a notification that the memory device has recovered from the APL event.

11. The method of claim 10, further comprising:

determining whether the data from the last written page and additional data from the related page are readable, recoverable, or unrecoverable; and at least one of:

responsive to a determination that the data from the last written page and the additional data from the related page are readable and recoverable, reading the data, copying the data to the temporary storage area, and incrementing the write pointer; or responsive to a determination that the data from the last written page or the additional data from the related page is unrecoverable:

writing first dummy data on the last written page and the related page and second dummy data on a first erased page in the block; and incrementing the write pointer by the deterministic number of pages.

12. The method of claim 11, further comprising:

searching for the first erased page in the block, wherein the write pointer corresponds to a logical address of the first erased page before being incremented by the deterministic number of pages.

13. The method of claim 11, wherein identifying the last written page comprises subtracting the deterministic number of pages from a logical address of the first erased page to obtain a logical address of the last written page.

14. The method of claim 11, further comprising:

discarding original data from the last written page and the related page associated with the memory cell notifying a host system that the memory device is ready for the subsequent programming operation after the APL event; and discarding original data from the first erase page before notifying the host system that the memory device is ready for the subsequent programming operation after the APL event.

15. A non-transitory computer-readable storage medium comprising instructions that, when executed by a processing device, cause the processing device to perform operations comprising:

detecting an occurrence of an asynchronous power loss (APL) event in a memory sub-system;

responsive to detecting the occurrence of the APL event, performing an APL handling operation comprising:

identifying a last written page at a first page location in a block of a memory device of the memory sub-system, wherein the last written page is associated with a memory cell of the memory device;

copying data from the last written page and from a related page associated with the memory cell to a temporary storage area in the memory device, wherein the related page is part of a same page stack associated with a same wordline of the memory device as the last written page;

incrementing a write-pointer associated with the last written page by a deterministic number of pages;

copying the data from the temporary storage area to a second page location in the block of the memory device, wherein the second page location is identified by the write-pointer; and providing a notification that the memory device has recovered from the APL event.

16. The non-transitory computer-readable storage medium of claim 15, wherein the instructions to cause the processing device to perform operations further comprising:

determining whether the data from the last written page and additional data from the related page are readable, recoverable, or unrecoverable; and at least one of:

responsive to a determination that the data from the last written page and the additional data from the related page are readable and recoverable, reading the data, copying the data to the temporary storage area, and incrementing the write pointer; or responsive to a determination that the data from the last written page or the additional data from the related page is unrecoverable:

writing first dummy data on the last written page and the related page and second dummy data on a first erased page in the block; and incrementing the write pointer by the deterministic number of pages.

17. The non-transitory computer-readable storage medium of claim 16, wherein the instructions to cause the processing device to perform operations further comprising:

searching for the first erased page in the block, wherein the write pointer corresponds to a logical address of the first erased page before being incremented by the deterministic number of pages.

18. The non-transitory computer-readable storage medium of claim 16, wherein identifying the last written page comprises subtracting the deterministic number of pages from a logical address of the first erased page to obtain a logical address of the last written page.

19. The non-transitory computer-readable storage medium of claim 16, wherein the instructions to cause the processing device to perform operations further comprising:

discarding original data from the last written page and the related page associated with the memory cell notifying a host system that the memory device is ready for the subsequent programming operation after the APL event; and discarding original data from the first erase page before notifying the host system that the memory device is ready for the subsequent programming operation after the APL event.

20. The non-transitory computer-readable storage medium of claim 16, wherein the memory device comprises single-level cell (SLC) memory, and wherein the deterministic number of pages in the block is one.

* * * * *